United States Patent
Waxman et al.

(10) Patent No.: US 12,505,028 B2
(45) Date of Patent: Dec. 23, 2025

(54) AUTOMATIC GENERATION OF TEST SCENARIOS FROM SPECIFICATION FILES

(71) Applicant: LPL FINANCIAL, LLC, Boston, MA (US)

(72) Inventors: Xeth Waxman, York, SC (US); Nagaraj Bhadurgatte Revanasiddappa, Austin, TX (US); Mamatha Pathipati, Cedar Park, TX (US); Billy Runyan, Austin, TX (US)

(73) Assignee: LPL FINANCIAL, LLC, Boston, MA (US)

( * ) Notice: Subject to any disclaimer, the term of this patent is extended or adjusted under 35 U.S.C. 154(b) by 264 days.

(21) Appl. No.: 18/130,970

(22) Filed: Apr. 5, 2023

(65) Prior Publication Data

US 2024/0338306 A1    Oct. 10, 2024

(51) Int. Cl.
G06F 9/44 (2018.01)
G06F 9/54 (2006.01)
G06F 11/36 (2025.01)
G06F 11/3668 (2025.01)

(52) U.S. Cl.
CPC ............ G06F 11/3684 (2013.01); G06F 9/54 (2013.01)

(58) Field of Classification Search
CPC ............................... G06F 9/54; G06F 11/3684
See application file for complete search history.

(56) References Cited

U.S. PATENT DOCUMENTS

| | | |
|---|---|---|
| 10,545,730 B2 * | 1/2020 | McCune .................. G06F 8/30 |
| 10,733,088 B1 * | 8/2020 | Sommers ............ G06F 11/3688 |
| 2017/0102925 A1 * | 4/2017 | Ali ............................ G06F 8/30 |
| 2023/0055527 A1 * | 2/2023 | Majithia ............... G06F 11/079 |
| 2023/0065572 A1 * | 3/2023 | Sathianarayanan ... G06F 16/955 |
| 2023/0283515 A1 * | 9/2023 | Mary .................. H04L 41/0806 |
| | | 709/203 |

* cited by examiner

*Primary Examiner* — S. Sough
*Assistant Examiner* — Mohammad H Kabir
(74) *Attorney, Agent, or Firm* — Mintz Levin Cohn Ferris Glovsky and Popeo, P.C.

(57) ABSTRACT

A method, a system, and computer program product for managing an application programming interface (API). A specification file including values describing an API is received. A template of the API is retrieved based on at least one of the values. A source code of the API and a test corresponding to the source code are generated using a parameterized predefined code from the template that is modified to replace parameters based on the values of the specification file. The source code of the API is validated using the test.

16 Claims, 8 Drawing Sheets

Model Validation Test Code 220

```
using Xunit;
using Test-Patent.Api;
using Test-Patent.Api.Models;
using System.Reflection;
using System.ComponentModel.DataAnnotations;

namespace Test-Patent.UnitTest public class ModelValidationUnitTest
{
    void InitProperties(object obj)
    {
        foreach (var prop in obj.GetType()
            .GetProperties(BindingFlags.Public | BindingFlags.Instance)
            .Where(p => p.CanWrite))
        {
            var type = prop.PropertyType;
            var constr = type.GetConstructor(Type.EmptyTypes); //find parameless const
            if (type.IsClass && constr != null && !prop.ReflectedType.Name.Contains("List"))
            {
                var propInst = Activator.CreateInstance(type);
                prop.SetValue(obj, propInst, null);
                InitProperties(propInst);
            }
        }
    }

IList<ValidationResult> myvalidation(object model)
    {
        var result = new List<ValidationResult>();
        var validationContext = new ValidationContext(model);
        Validator.TryValidateObject(model, validationContext, result);
        if (model is IValidatableObject) ((model as IValidatableObject).validate(validationContext);

return result;
    }
}
```

AUTOMATIC GENERATION OF TEST SCENARIOS FROM SPECIFICATION FILES

TECHNICAL FIELD

The subject matter described herein relates generally to software testing and more specifically to automatic generation of test scenarios during development of an application programming interface (API).

BACKGROUND

Automatic execution of continuous integration and continuous deployment (CI/CD) processes are widely used. Traditional deployment processes include automatic deployment, configuration of software systems, and execution of automatic tests. Tools that generate unit tests can scan pre-written code and infer testable logic. But tests derived from pre-written code can suffer from two issues: (1) the tool is limited to completed code, at which point a developer may find out that the code has been wrong from the beginning, and (2) the inferences from pre-written erroneous code can result in a test with an error in it, leading to false negatives where an issue cannot to be detected via automated testing. To manually test the software, the testing may need to deploy the software on various hardware platforms having different configurations, operating systems, peripherals, and the like, which increases the complexity of the testing process.

SUMMARY

Systems, methods, and articles of manufacture, including computer program products, are provided for automatic generation of test scenarios during development of an application programming interface (API). In one aspect, there is provided a method. The method may include receiving, a specification file including values describing an application programming interface (API), retrieving, from a database, a template of the API based on at least one of the values, generating, using the template, a source code of the API and a test corresponding to the source code, wherein generating the source code of the API includes generating a parameterized predefined code from the template and modifying the parameterized predefined code to replace parameters based on the values of the specification file, and validating the source code of the API using the test.

In some variations, one or more features disclosed herein including the following features can optionally be included in any feasible combination. In some implementations, the method further includes: determining whether the specification file originates from a whitelisted server. In some implementations, the method further includes: generating a notification indicating completion of a validation of the source code of the API. In some implementations, the specification file includes a mark-up language and a standardized tagging structure to describe paths, operations, and parameters of the API. In some implementations, generating the test includes collating the specification file with the template to generate the test. In some implementations, the method further includes: deploying the source code of the API to an environment. In some implementations, validating the source code of the API using the test includes verifying an execution of each function of the source code for one or more conditions of the environment. In some implementations, the method further includes: verifying a database to determine whether an API matching the specification file already exists. In some implementations, the test includes a model validation test code or a domain host test code. In some implementations, the template includes a building frame of the API and unit test blocks of the test. In some implementations, retrieving the template is by a template engine that includes an application for matching the at least one of the values with the template.

In another aspect, a system, includes: at least one data processor, and at least one memory storing instructions which, when executed by the at least one data processor, cause operations including: receiving, a specification file including values describing an application programming interface (API), retrieving, from a database, a template of the API based on at least one of the values, generating, using the template, a source code of the API and a test corresponding to the source code, wherein generating the source code of the API includes generating a parameterized predefined code from the template and modifying the parameterized predefined code to replace parameters based on the values of the specification file, and validating the source code of the API using the test.

In some variations, one or more features disclosed herein including the following features can optionally be included in any feasible combination. In some implementations, the operations further include: determining whether the specification file originates from a whitelisted server. In some implementations, the operations further include: generating a notification indicating completion of a validation of the source code of the API. In some implementations, the specification file includes a mark-up language and a standardized tagging structure to describe paths, operations, and parameters of the API. In some implementations, generating the test includes collating the specification file with the template to generate the test. In some implementations, the operations further include: deploying the source code of the API to an environment. In some implementations, validating the source code of the API using the test includes verifying an execution of each function of the source code for one or more conditions of the environment.

In another aspect, a non-transitory computer-readable storage medium includes programming code, which when executed by at least one data processor, causes operations including: receiving, a specification file including values describing an application programming interface (API), retrieving, from a database, a template of the API based on at least one of the values, generating, using the template, a source code of the API and a test corresponding to the source code, wherein generating the source code of the API includes generating a parameterized predefined code from the template and modifying the parameterized predefined code to replace parameters based on the values of the specification file, and validating the source code of the API using the test.

In some variations, one or more features disclosed herein including the following features can optionally be included in any feasible combination. In some implementations, the operations further include: determining whether the specification file originates from a whitelisted server. In some implementations, the operations further include: generating a notification indicating completion of a validation of the source code of the API. In some implementations, the specification file includes a mark-up language and a standardized tagging structure to describe paths, operations, and parameters of the API. In some implementations, generating the test includes collating the specification file with the template to generate the test. In some implementations, the operations further include: deploying the source code of the API to an environment. In some implementations, validating the source code of the API using the test includes verifying an execution of each function of the source code for one or more conditions of the environment.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the multiplication of database objects, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Implementations of the present disclosure are generally directed to automatic generation of test scenarios from a specification file of an application programming interface (API) to assist with successful continuous integration and continuous deployment of the API. An API can enable communication between various layers of an application structured as a microservice. The microservice architecture can be suitable for rapid, frequent, and reliable delivery of applications that are large and/or complex. Successfully validated APIs can be automatically deployed to multiple environments of the microservice architecture including integration, test, and production environments.

The overall setup of the environments can be very complex and can depend on many components. Some environment components can have a fixed version and other computing components can vary. The variable computing components can be referred to as "moving parts." In some environments, especially in cloud computing environments, the "moving parts" can have a significant effect on the API stability, potentially leading to API deployment errors. Traditional manual API testing techniques can raise additional issues for API integration and deployment to system development life cycle (SDLC) environments. For example, tests derived from pre-written code can include critical environment incompatibility issues from the beginning, making the entire API code unusable. As another example, the inferences from pre-written erroneous API code can result in a test with inherited errors that can lead to false negative test results where an issue cannot to be detected via automated testing. To manually test the software, the testing may need to deploy the software on various hardware platforms having different configurations, operating systems, peripherals, and the like, which increases the complexity of the testing process.

To avoid the drawbacks of traditional API testing process described above, in some implementations of the current subject matter, automatic test scenario development can be used using templates corresponding to different protocols to allow deployment of APIs to different environments. Using the described implementations herein, test scenarios are automatically generated from a specification file of an API to assist with successful continuous integration and continuous deployment of the API. In particular, the specification file describing the API can be used in combination with an environment specific template to generate a source code of the API and a test corresponding to the source code. By using environment specific templates, validated APIs can be automatically deployed to the SDLC environments. Derivation of tests from environment specific templates can provide advantages including consistency in resource sizing, operating systems, patch-level, and no-downtime-deployments. Automatic derivation of test scenarios enabling validation and deployment of APIs can increase troubleshooting efficiency by minimizing the time needed to identify and implement solutions to successfully complete software deployment to different SDLC environments. Automatically derived tests can be augmented with the capability to query an existing API registry systems so that the user can be alerted an existing API already exists that would meet the needs of the user, saving processing resources. Another advantage of some of the described implementations is that the API creation process can be limited to authorized users of a whitelisted server, increasing a security of the API creation process.

Figure 1:
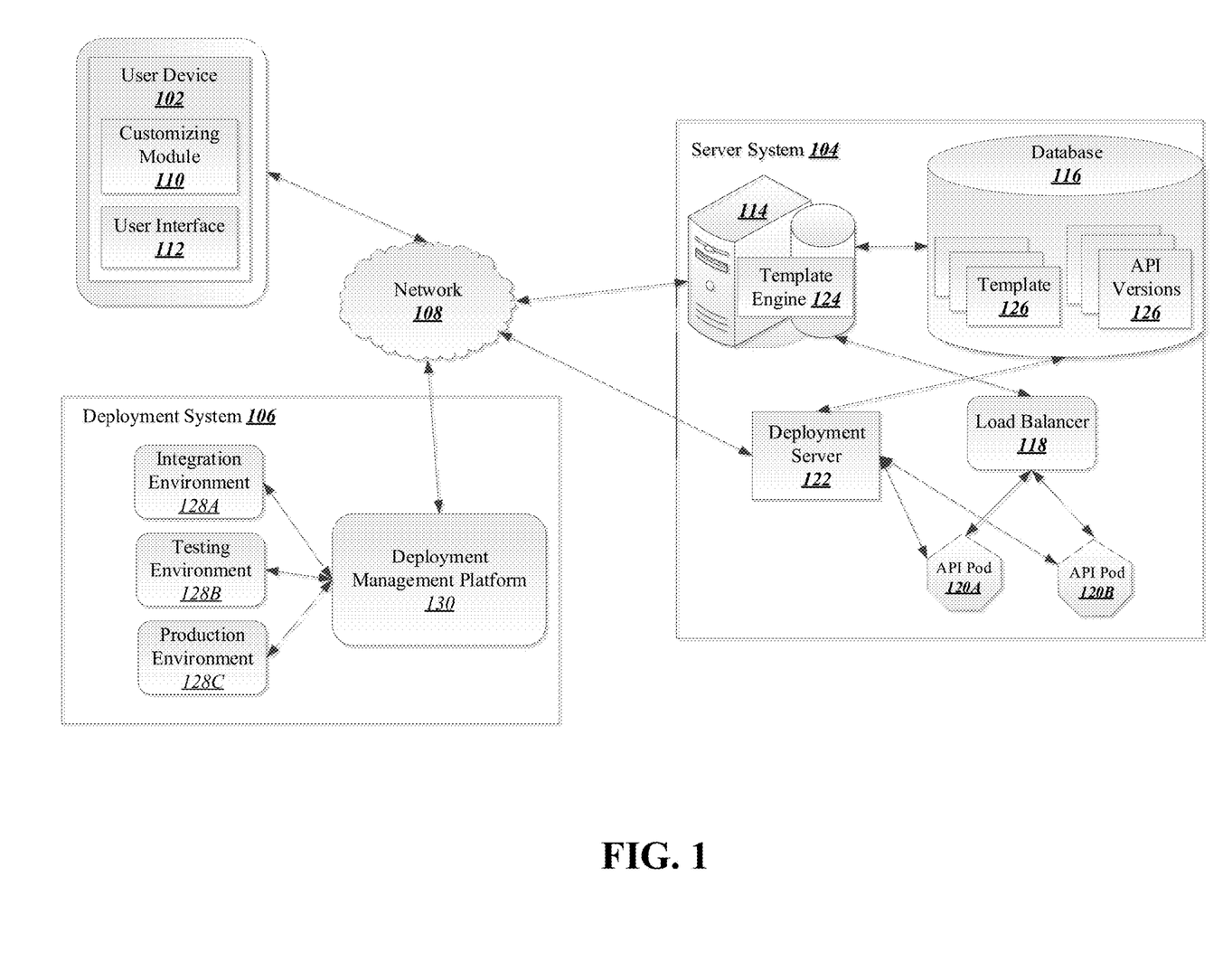
FIG. 1 depicts a diagram of an example system, in accordance with some example implementations.

FIG. 1 depicts a diagram of an example system 100, for automatic validation and deployment of software, in accordance with some example implementations. The example system 100 can include a user device 102, a server system 104, a deployment system 106 and a network 108. In the depicted example, the user device 102 includes a customization module 110 and a user interface 112. The customization module 110 can be configured to enable creation and modification of API specification files (e.g., specification file 200 described with reference to FIG. 2A). The user interface 112 can enable an entry of a user input to enter values corresponding to selected API parameters to be used for creation and modification of API specification files. The user interface 112 can enable an entry of a user input to select and transmit the API specification files via the network 108, to the server system 104 for the development of an API. For example, the customization module 110 can interact with an application that is hosted by a template engine 114 of the server system 104 to define the API software product to be developed in parallel with corresponding tests.

The user device 102 can be and/or include any type of processor and memory based device, such as, for example, cellular phones, smart phones, tablet computers, laptop computers, desktop computers, workstations, personal digital assistants (PDA), network appliances, cameras, enhanced general packet radio service (EGPRS) mobile phones, media players, navigation devices, email devices, game consoles, or an appropriate combination of any two or more of these devices or other data processing devices. The user device 102 can transmit a specification file of an API to the server system 104 to automatically generate a source code of the API and a test corresponding to the source code.

The server system 104 includes one or more server devices 114, a database 116, a load balancer 118, pods 120A, 120B, and a deployment server 122. In some implementations, the one or more server devices 114 include at least one server and at least one data store configured to store data associated with previously developed and deployed APIs. In the example of FIG. 1, the server devices 114 are intended to represent various forms of servers including, but not limited to a web server, an application server, a proxy server, a network server, and/or a server pool. In general, server systems accept requests for application services and provides such services to any number of user devices (e.g., the user device 102 and computing devices) over the network 108.

The server devices 114 can include a template engine 124. In accordance with some implementations of the present disclosure, the template engine 124 can include a template management system configured to select matching templates for the development of a software product for an API with a particular specification. The template engine 124 can use as input, the API specification file provided by the user device 102. The template engine 124 can process the API specification file through a software development and deployment service, using templates 126 retrieved from the database 116, to provide an output including templates for an API source code generation and templates for tests for validating the API source code. The template engine 124 can transmit the output to the load balancer 118.

As shown in FIG. 1, the database 116 can be a dedicated, single-container database system running a single instance of the server system 104. However, where the database 116 can implement a multitenant database architecture (e.g., multitenant database containers (MDC)), such that each tenant of the server system 104 can be served by separate instances of the server system 104. The database 116 can include a cloud database system environment, an on-premise database system (e.g., system databases, tenant databases, etc.), servers (e.g., name server(s), index server(s), script server(s), etc.). The database 116 can be a structured database that separately stores templates 126 corresponding to different environments 128A, 128B, 128C, used to generate environment specific test codes and previously generated versions of the API. The database 116 can include private and public repositories.

The server device 114 can send the result data (templates for API software code and environment specific test codes) to the load balancer 118. The load balancer 118 can be configured to securely manage workloads of the server system 104, by identifying which of the computing servers (or computing nodes) or API pods 120A, 120B can execute requested services without generating conflicts with ongoing or scheduled services and adaptively directing the requested services to the API pods 120A, 120B to reduce latency, improve the reliability, and efficiency of API validation execution during authenticated API customizing sessions. In some implementations, the load balancer 118 can load-balance incoming API generation and validation requests according to a round-robin distributions scheme, regulated relative to ongoing and/or scheduled services to adaptively direct the requested services to the API pods 120A, 120B, to which various generation and validation operations are directed in a sequential and continuous manner. For example, the load balancer 118 can coordinate transmission of the template engine result data (templates for API software code and environment specific test codes) to an available API pod 120A or 120B to execute generation and validation of the API software code using matching tests. The API pod 120A or 120B can generate a document summary of the API creation and testing process in pdf form or in HTML. The generated documents may be used to verify and/or document the generation and testing of the API.

The deployment server 122 can include a deployment management system configured to receive validated API software products from the API pods 120A and 120B. The deployment server 122 can transmit the validated API software products to the database 116 for storage as an API version 126 and to the deployment system 106 for deployment to the environments 128A, 128B, 128C. The one or more server devices 114 can track the deployment of the validated API software product to the environments 128A, 128B, 128C. The deployment system 106 can use a deployment management platform 130 for transmitting validated APIs that are specific to a particular environment to the corresponding environment 128A, 128B, or 128C of the deployment system 106. For example, the deployment management platform 130 can process a metadata of the validated API to identify the corresponding environment 128A, 128B, or 128C to transmit the validated API to the corresponding environment 128A, 128B, or 128C.

As shown in FIG. 1, the server system 104, can be communicatively coupled with the user device 102 and the deployment system 106 to enable automatic software development, validation, and deployment, via the network 108. It should be appreciated that the network 108 can be any wired and/or wireless network including, for example, a public land mobile network (PLMN), a local area network (LAN), a wide area network (WAN), the Internet, a cellular network, a telephone network (e.g., PSTN) or an appropriate combination thereof connecting any number of communication devices, mobile computing devices, fixed computing devices, server systems, and/or the like. The user device 102 and/or the computing devices 114A, 114B, 114C can include any combination of fixed and variable computing components.

Figure 2A:
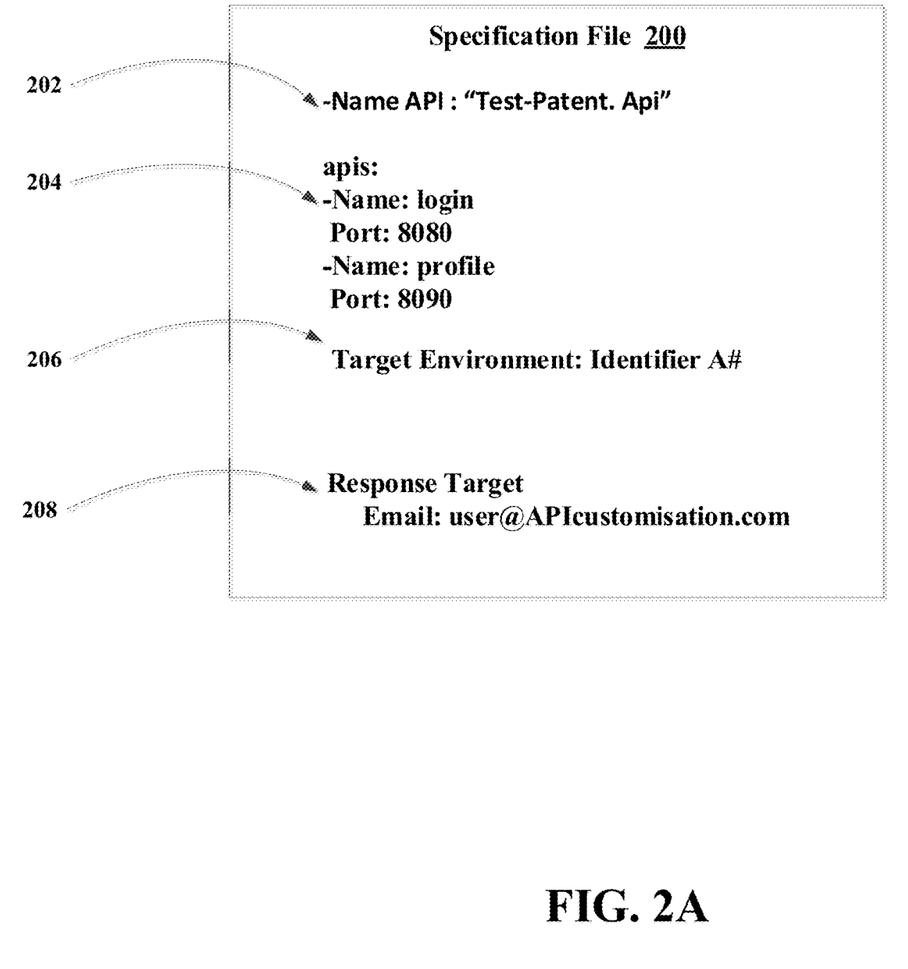
FIG. 2A depicts an example of a specification file, in accordance with some example implementations.

FIG. 2A depicts an example of a specification file 200, which may be a configuration file script. The specification file 200 can be formatted using a human-readable language including a language-independent format that can be used with any programming language. For example, the specification file 200 can be JavaScript Object Notation (JSON), Yaml, Ruby, Python, VBScript, or some other high-level script. In the example of FIG. 2, the specification file 200 includes multiple values, such as a name 202 of the API to be generated, API parameters 204 describing the API, an identifier of a target environment 206, and an email address to transmit a response indicating the API customization outcome. The values can include numbers, strings, null values, Boolean, dates, timestamps, sequences, and/or nested values. The specification file 200 can be generated using a customizing module (e.g., customizing module 110 described with reference to FIG. 1) and can be stored on a user device (e.g., user device described with reference to FIG. 1) or an external database from where it can be uploaded during an API generation process. In some implementations, the specification file 200 can include an action defining a result type selected by the specification file author. The action can include download project (in compressed format) or enable continuous integration and continuous deployment pipeline.

Figure 2B:
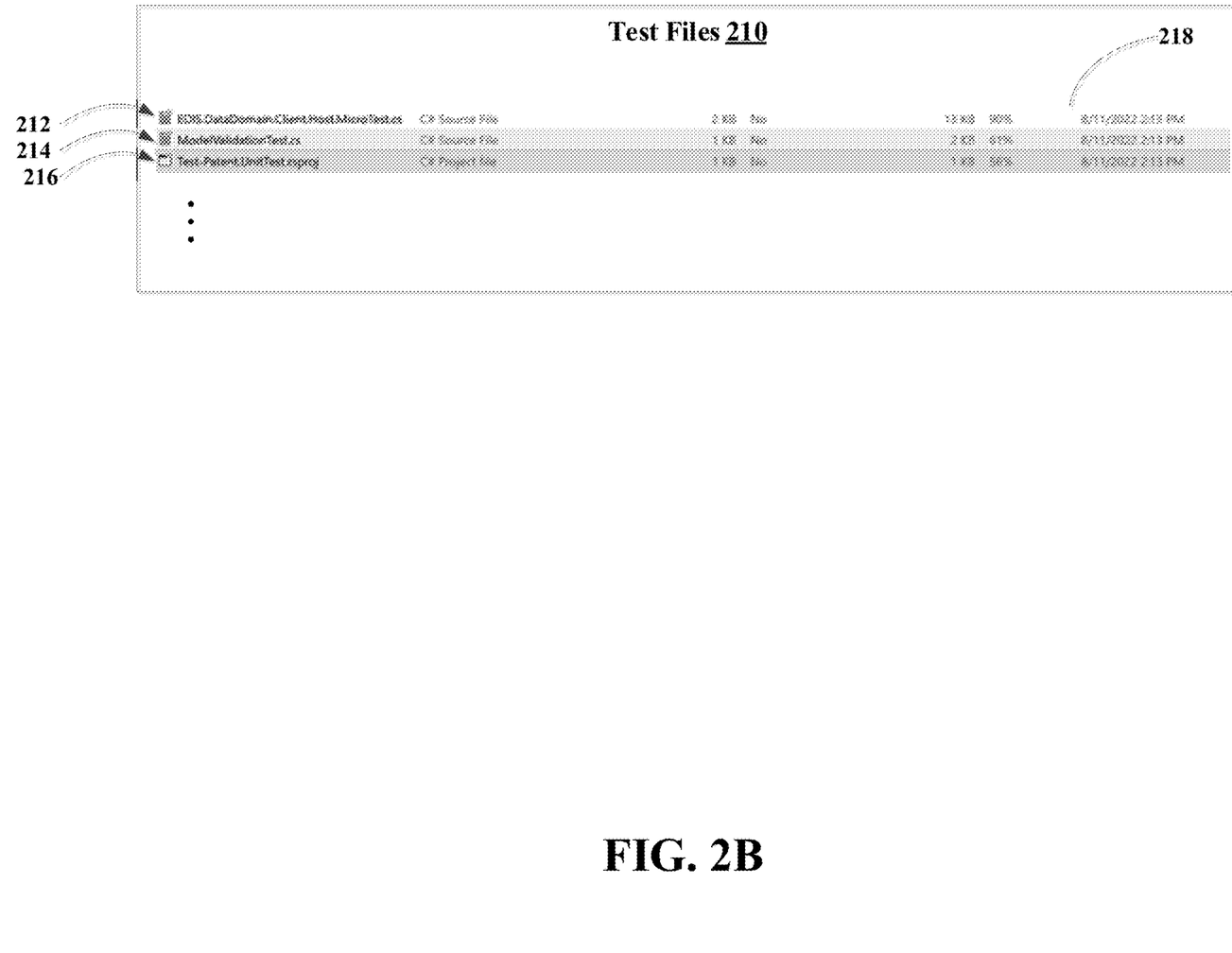
FIG. 2B depicts an example of a set of test files, in accordance with some example implementations.

FIG. 2B illustrates an example of a list of test files 210, which may be generated based on a configuration file script. The list of test files 210 can include multiple test files such as a test of the API configuration relative to the selected environment 212, a test for a model validation 214, and an API unit test 216. The list of test files 210 can include one or more parameters 218 of the test files, such as a name of the source file type (e.g., C #), a size of the test file, creation date of the test file, and other parameter types.

Figure 2C:
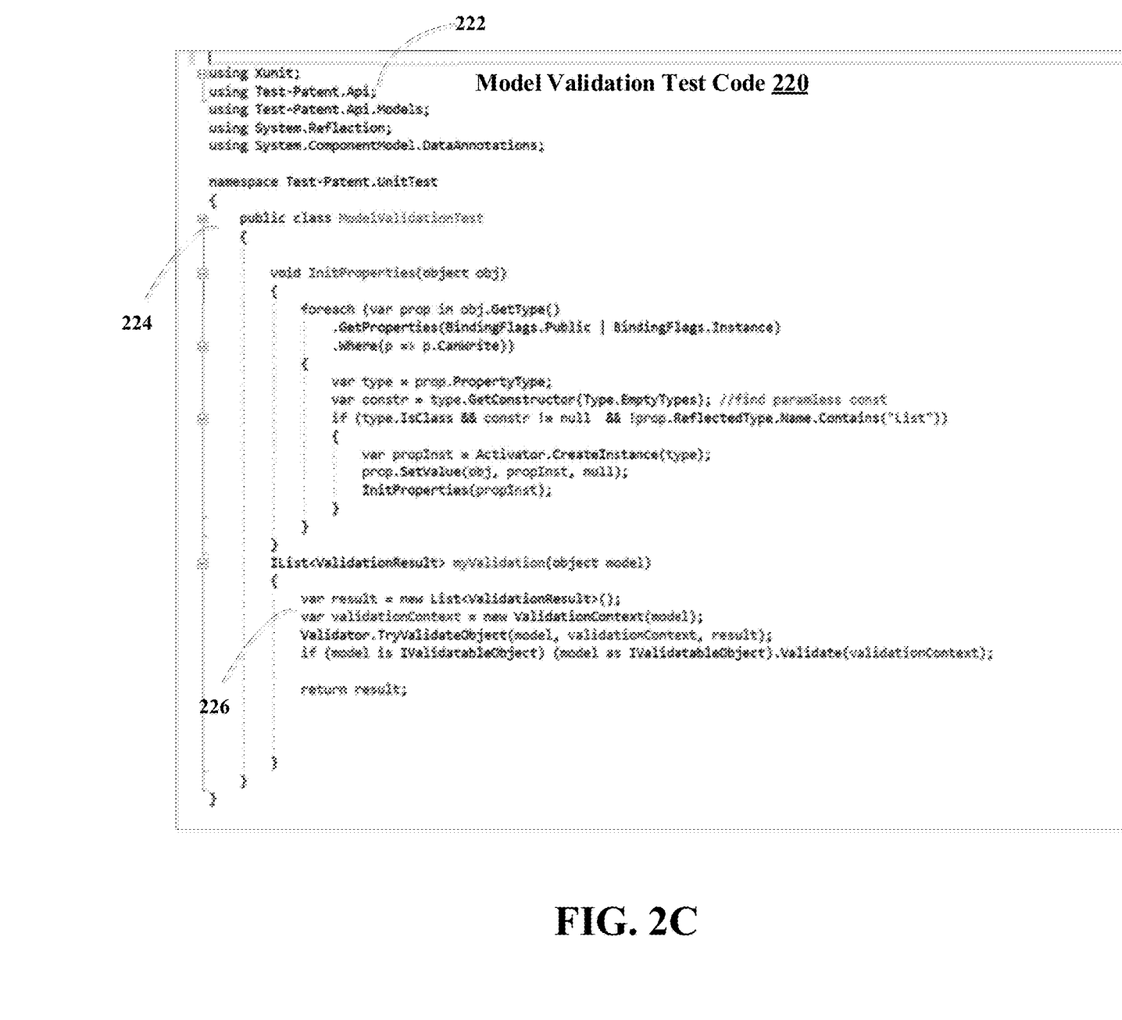
FIG. 2C depicts an example of a model validation test code, in accordance with some example implementations.

FIG. 2C depicts an example of a model validation test code 220, which may be derived from a configuration file script to validate an API generated from the same configuration file script. The model validation test code 220 can be formatted using a programming language (e.g., C #, Python or java) executable by an application installed in an API pod (e.g., API pods 120A, 120B described with reference to FIG. 1). The model validation test code 220 can have a structure defined by the template used to generate the test file. The structure of the model validation test code 220 can include a pattern such as "target invocation-act-assert." The target invocation portion 222 of the model validation test code 220 includes a call of the API and one or more models and model files that are called for testing the API, such as "Test-Patent.Api," "Test-Patent.Api. Models," "System. Reflection" and "System.ComponentModel.DataAnnotations." The act portion 224 of the model validation test code 220 includes a class (e.g., public class "ModelValidationTest") configured for API validation. The assert portion 226 of the model validation test code 220 includes listing of operations for validation results with a command to transmit a result of the validation.

Figure 2D:
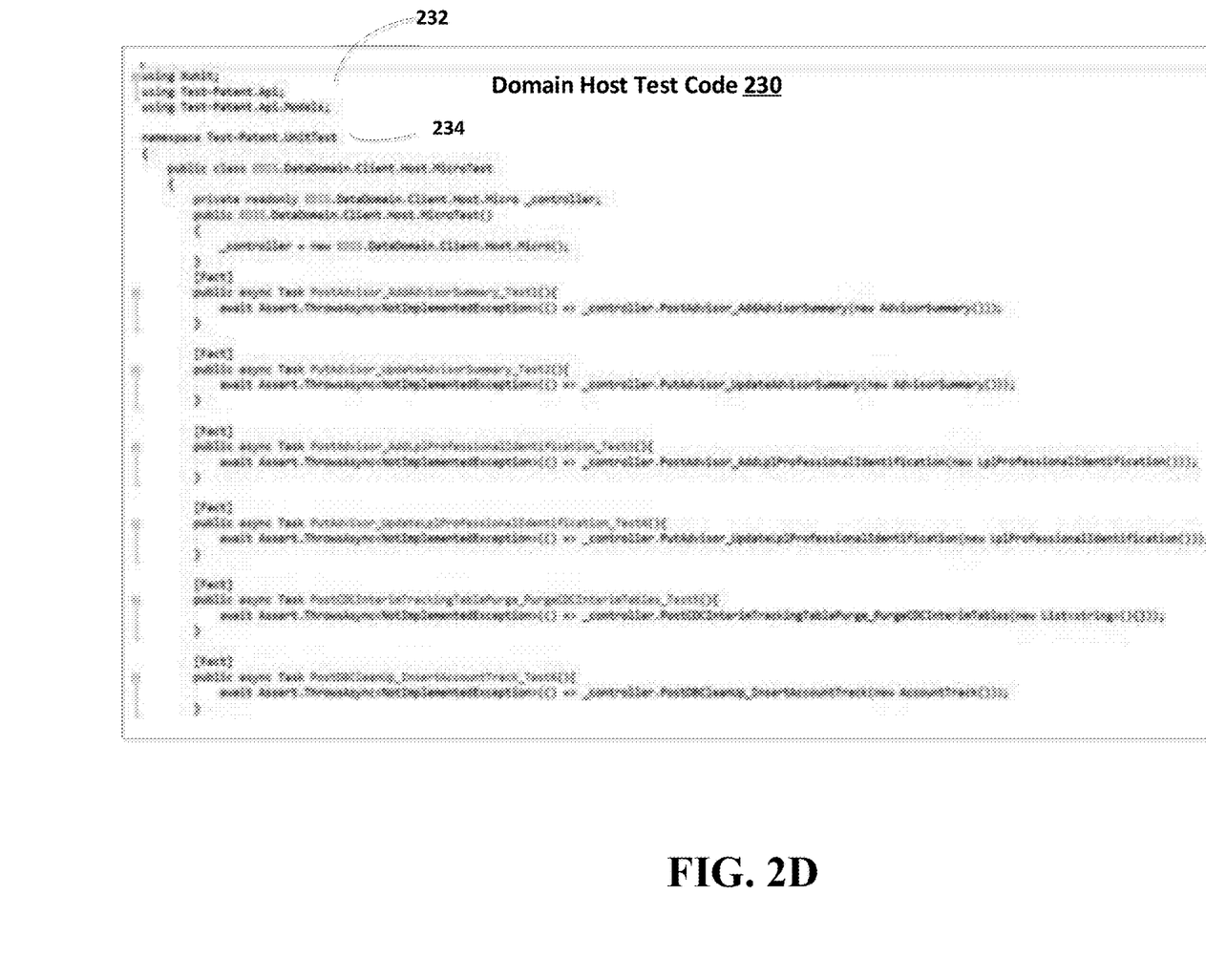
FIG. 2D depicts an example of a domain host test code, in accordance with some example implementations.

FIG. 2D depicts an example of a domain host test code 230, which may be derived from a configuration file script to validate an API generated from the same configuration file script. The domain host test code 230 can be formatted using a programming language (e.g., C #, Python or java) executable by an application installed in an API pod (e.g., API pods 120A, 120B described with reference to FIG. 1). The domain host test code 230 can have a structure defined by the template used to generate the test file. The structure of the domain host test code 230 can include a pattern such as "target invocation-validation." The target invocation portion 232 of the model validation test code 220 includes a call of the API and one or more models and model files that are called for testing the API, such as "Test-Patent.Api" and "Test-Patent.Api. Models." The validation portion 234 of the domain host test code 230 defines the namespace (target environment for testing) and includes a class (e.g., public class "DataDomanin.Client.Host.MicroTest") configured for API validation for a particular environment.

The model validation test code 220 illustrated in FIG. 2C and the domain host test code 230 shown in FIG. 2D include test operations that may be performed on a variety of different machines, some of which may have different configurations. The test script also includes a test operation for verifying that a user interface element, such as "Company Code," is displayed properly on a screen and a test operation for verifying that when an input value, such as "!CC," is input, during testing, into the user interface (UI) element, a proper result is displayed (or returned).

Although the described model validation test code 220 illustrated in FIG. 2C and the domain host test code 230 shown in FIG. 2D seem like a relatively simple task for a human, it is more difficult to perform in an automated way with a machine. For example, if the test is being performed across a plurality of different computers having different types (e.g., sizes) of screens, different operating systems, and the like, the UI element "Company Code" may appear in different portions of the display—making it more difficult to test as well as making it more difficult to provide an input value for that UI element. In some implementations, there is provided an automated software testing based on a machine learning model and an optical character recognizer.

Figure 3A:
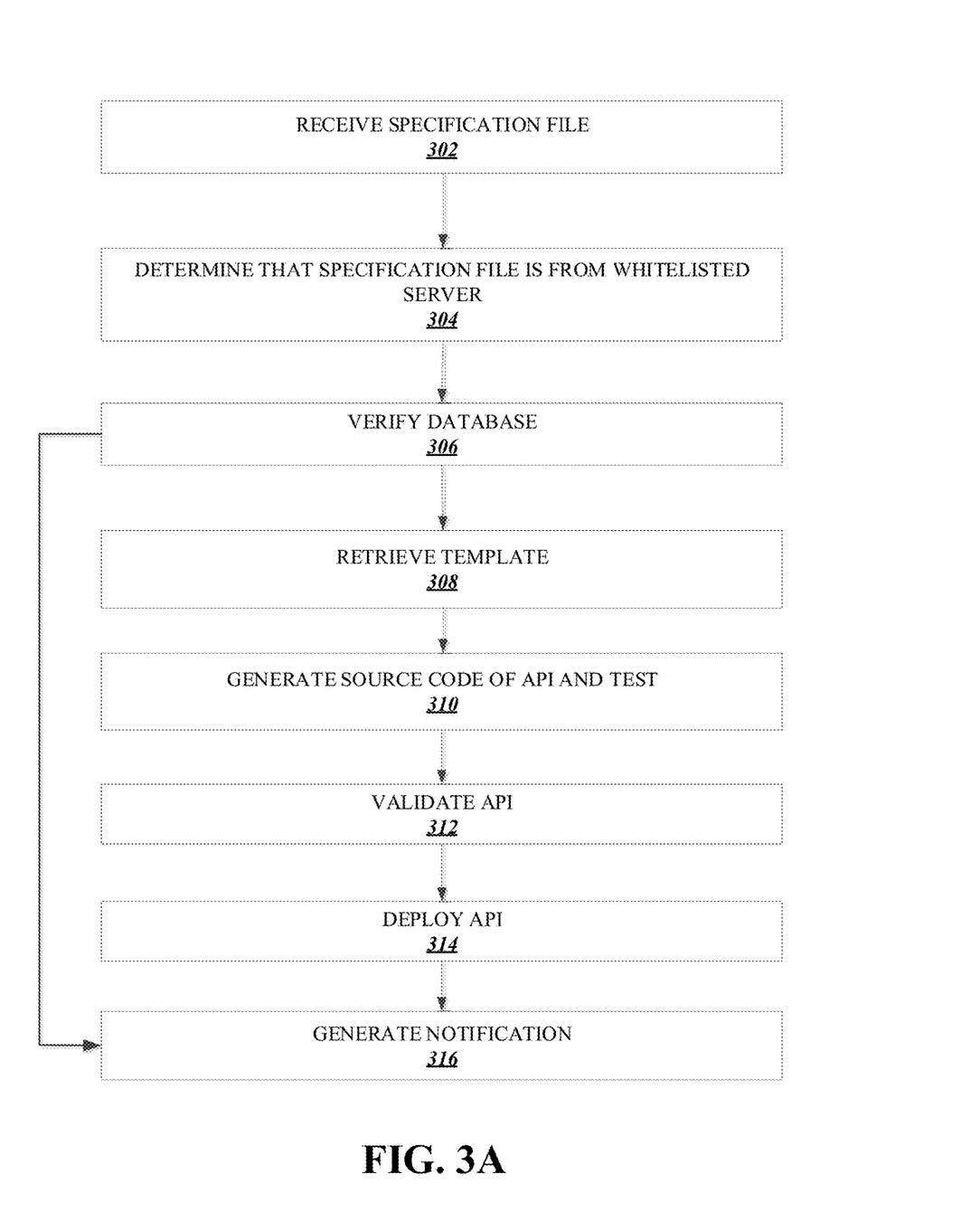
FIGS. 3A and 3B depict examples of processes, in accordance with some example embodiments.

FIG. 3A depicts an example of a process 300 for performing automated API creation and testing from a specification file. The example of a process 300 can be executed using the example system 100 described with reference to FIG. 1, the computing system 400 described with reference to FIG. 4 and can us the example files described with reference to FIGS. 2A-2D.

At 302, a specification file of an API is received. The specification file can include values describing the API, such as a name of the API to be generated, API parameters describing the API, an identifier of a target environment, an email address to transmit a response indicating the API project result, and an action defining a result type (e.g., download project (in compressed format) or enable continuous integration and continuous deployment pipeline). In some implementations, the name of the API can include an identifier of a microservice/web application, for which the API is created. The values can include numbers, strings, null values, Boolean, dates, timestamps, sequences, and/or nested values. The specification file can be formatted using a human-readable language including a language-independent format (e.g., JavaScript Object Notation (JSON), Yaml, Ruby, Python, and VBScript) that can be used with any programming language or a particular programming language. In some implementations, the specification file can include a human-readable format with simple grammar and syntax that is easy to compose even for non-technical users.

At 304, it is determined whether the specification file originates from a whitelisted server by processing the user credentials (user name, user password, user affiliation, user clearing level and affiliation clearing level) of a user identified as an author of the specification file. If all credentials are verified and approved for API creation and deployment, it is determined that the specification file originates from a whitelisted server. If any of the verified credentials is disapproved for API creation and deployment, it is determined that the specification file fails to originate from a whitelisted server and the API creation and deployment project is aborted and a notification including an error message is transmitted to the author of the specification file. The verification of the credentials associated with the specification file increases a security of a microservice/web application that can use the API, by preventing a user with malicious intentions from introducing a microservice/web application vulnerability.

At 306, a database, storing previously created APIs, is verified to determine whether an API matching the specification file already exists. If a previously created API matches the values defined in the specification file, the matching API is transmitted as a result to the API creation request and a notification is generated.

At 308, in response to determining that the database, storing previously created APIs, fails to include an API matching the specification file, a template of the API is retrieved from the database by using a template engine and one or more values defined in the specification file. The template includes a building frame of the API and unit test blocks of the test files configured for testing the API. The template engine can include an application for matching at least one value defined in the specification file with the template. In some implementations, the template engine may convert the high-level language of the specification file into a lower-level executable language for execution by the template engine.

At 310, a source code of the API and test(s) corresponding to the source code are generated by using the template. Generating the source code of the API can include generating a parameterized predefined code from the template and modifying the parameterized code to replace parameters based on the values included in the specification file. For example, the source code of the API can include API endpoints, models, and middleware, according to a defined configuration. Health checks are done as part of boilerplate code generation. Generating the test can include collating the values extracted from the API specification file with the retrieved template to generate the test. The test can include the API endpoints generated for the source code of the API and a model validation. For example, the test can include a test script defining a model validation test code or a domain host test code, as described with reference to FIGS. 2C and 2D.

At 312, the source code of the API is validated using the test(s). For example, a test script may be automatically executed to verify each function of the API and the compatibility of the API with one or more selected environments. For example, a test executor of an API pod (API pod 120A, 120B described with reference to FIG. 1) may test software operating on at least one environment including a device, such as a computer, a laptop, a smart phone, and/or other type of processor-based user device including memory. The test executor can perform a first test operation A at a first (e.g., testing) environment, a second test operation at a second (e.g., production) environment. The test executor can tests a user input by simulating the user input using a machine learning model to enable a fully automatic API creation and testing process. In some implementations, the machine learning model can be implemented using a neural network trained using training data (e.g., images including examples of UI elements and/or UI elements having a user interaction) to detect and identify the UI where a user input may be required. If the testing of any of the functions of the API generates an error, the function of the API associated with the error can be corrected. For example, a machine learning model can be used to correct the identified error based on similarities with past successfully corrected errors of a particular API function type. In some implementations, the machine learning model can be implemented using a neural network trained using training data (e.g., past successfully corrected errors of multiple API function types) to successfully correct errors. The tests can be repeated after each API source code update, until the results of all tests are free of errors, indicating successful creation of a functional API source code. If the test is not successful after a set number of iterations, an unexpected result may be displayed on a user interface of a user device (e.g., user device 102 described with reference to FIG. 1), such as an "error" indication or some other type of result other than the display of "!ICC." The test executor may flag the error for test operations and document the remaining error (e.g., record the result). The test executor may record the error and proceed with any additional test operations or stop or pause testing until the error is corrected. Each newly solved error can be stored in a database for future use by the machine learning model to enable future automatic solution implementations.

At 314, in response to successfully validating the API source code using the tests, the source code of the API is deployed to an environment that was selected in the specification file. In some implementations, the deployment is initiated by a deployment server and managed by a deployment management platform, as described with reference to FIG. 1.

At 316, a notification is generated. The notification can include a message summarizing the outcome of the API creation and deployment project. In some implementations, the message can include a detailed report of performed tests and confirmation codes of each executed step of the API creation and deployment project. For example, a document generator may generate a paper or electronic document listing the testing process undertaken by the test script and any results. This document may be stored, printed, or sent to various entities as part of the testing process to provide, for example, a reference manual. In some implementations, the notification can include an API key for sharing the deployed API with a team of users.

Figure 3B:
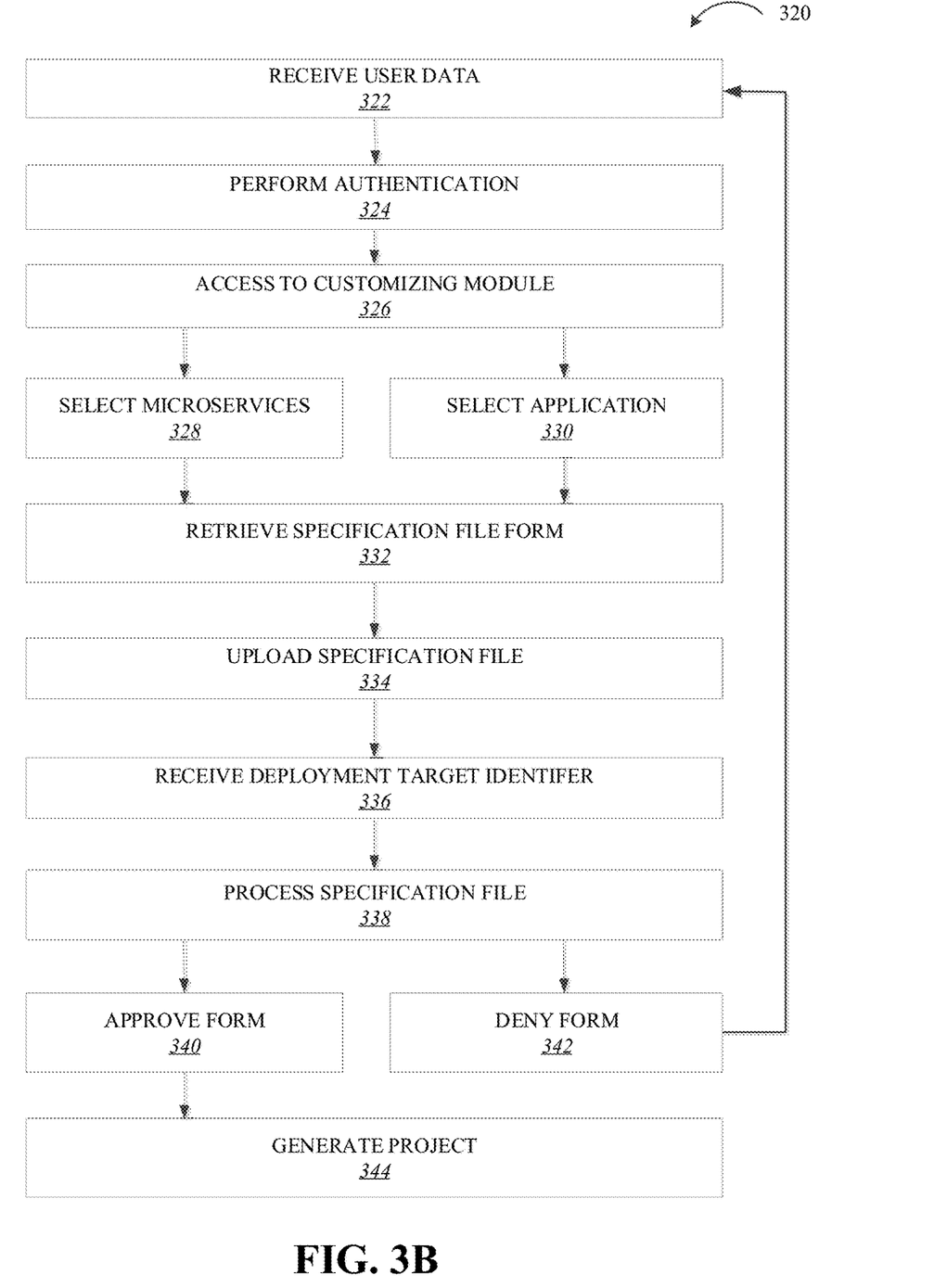

FIG. 3B depicts another example of a process 320 for performing automated API creation and testing from a specification file. The example of a process 320 can be executed using the example system 100 described with reference to FIG. 1, the computing system 400 described with reference to FIG. 4 and can us the example files described with reference to FIGS. 2A-2D.

At 322, user credential data is received. For example, a user of a user device (e.g., user device 102 described with reference to FIG. 1) can provide a user input on a user interface, the user input including the user credential data. The user credential data can include user name, user password, user affiliation, user clearing level and affiliation clearing level of a user of the user device.

At 324, user authentication is performed by verifying that the user is a registered user with rights to create and deploy an API. In some implementations, the authentication is a token based authentication that includes token generation by a whitelisted server or a whitelisted (approved) entity. If all user credentials are verified and approved for API creation and deployment, it is determined that the authentication is successful.

At 326, in response to successful authentication, the user is granted access to a customizing module configured for receiving user input to create and/or select a specification file for a new API. The customizing module requests and receives a user selection of API target implementation. For example, the use input includes a user selection between API creation for a microservice (328) or API creation for a web application (330).

At 332, a specification file form corresponding to the selected API target implementation is retrieved from a database and displayed on the user interface of the customizing module to be filled by the user to generate the specification file (e.g., specification file 200 described with reference to FIG. 2). The specification file form can include definitions of API endpoints. In some implementations, the specification file form can be a standard form used by an open-source tool (e.g., Swagger API) built to help programmers to develop, design, document, and use REST APIs. The completed specification file can be stored by the user device or an external database. The specification file can be JavaScript Object Notation (JSON), Yaml, Ruby, Python, VBScript, or some other high-level script.

At 334, a completed specification file can be selected (e.g., using a browsing operation or a file drop operation) as an input provided by using the user interface of the customizing module. In some implementations, the selection of the specification file can be limited to files with a particular format (e.g., JSON or Yaml).

At 336, an identifier of a deployment target for the new API is received. For example, the identifier can be included in a user input provided by using the user interface of the customizing module. The identifier can include a name of the project the API is deploying to. In some implementations, the user interface can include a dropdown list including multiple project names, including a target project (e.g., "Name the VPC the project is deploying to"). A user input can include a selection from the project names, such as Home Office, Advisor, Investor, or Shared Services.

At 338, the submitted specification file can be processed using one or more tests derived from the specification file, as described with reference to FIG. 3A. The specification file processing can include validation of one or more values included in the fields of the specification file.

If the tests are successful (specification file form is valid), at 340, the specification file form can be approved and a notification can be generated. The notification can include a (green) highlighted popup message with text indicative of the API creation outcome (e.g., "project created successfully").

If the tests indicate that the specification file form is invalid, at 342, the specification file form can be displayed by the user interface with the incorrect fields highlighted (in red) and user input can be requested to correct the values of the specification file form associated with the errors.

At 344, approved specification file forms can be used to generate the project by completing the creation and deployment of the API, as described with reference to FIG. 3A. For example, a user input (e.g., click) can be received to generate project based on the approved specification file form. A project generation API (e.g., BRAVE API) can generate an API skeleton (structure frame), unit test blocks and client invocation sampling. The project generation API can call a template code generator (e.g., Swagger API) to generate the source code for the API. The template code generator can be configured to automatically generate API endpoints, models, and middleware, and API configuration. One or more checks can be executed as part of the template code generation. The project generation API can invoke deployment actions of an assigned application (e.g., Octopus deployment actions). The deployment actions can provision and act on downstream continuous integration-continuous development components. The application (e.g., Octopus) can create a project in a public repository (e.g., Github Repo) using a predefined API (e.g., Github API), and manage the project deployment. A folder can be created for the successfully generated project.

Figure 4:
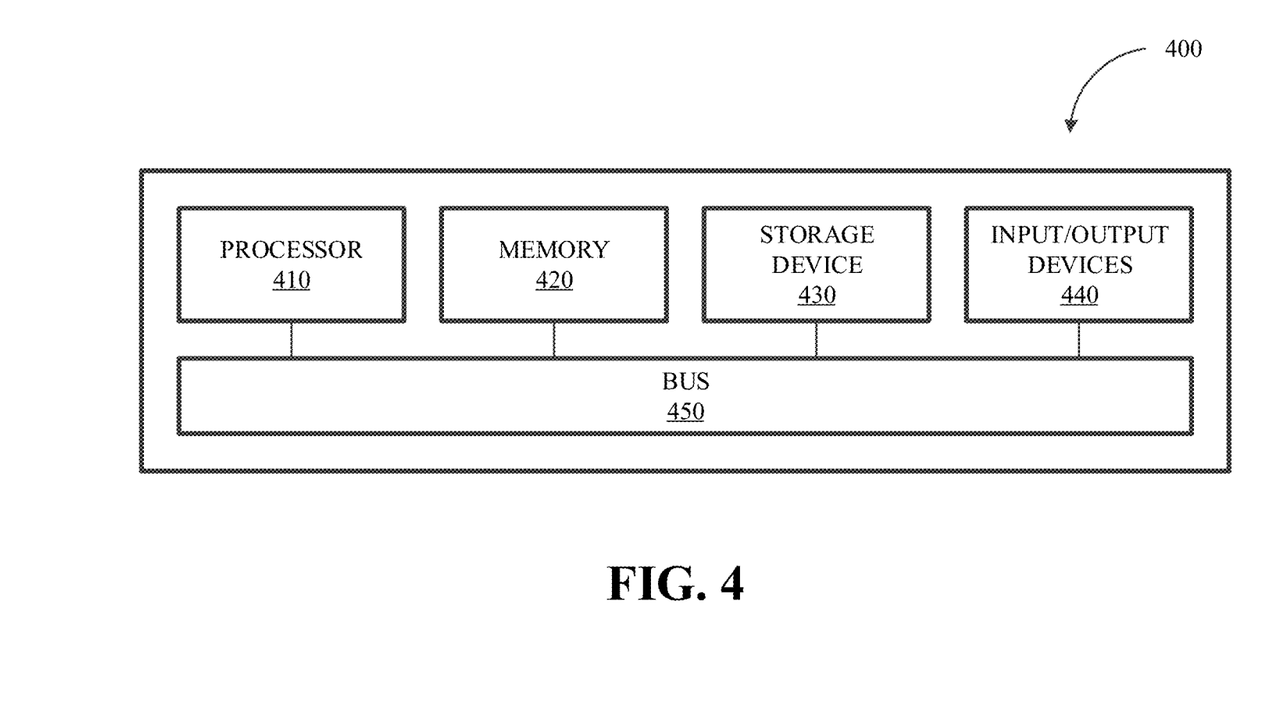
FIG. 4 depicts a block diagram illustrating a computing system, in accordance with some example embodiments.

FIG. 4 depicts a block diagram illustrating a computing system 400 consistent with implementations of the current subject matter. The computing system 400 may be used to host the system 299 and/or provide a host for the software under test which includes screen 200.

As shown in FIG. 4, the computing system 400 can include a processor 410, a memory 420 (which may include the specification file 200), a storage device 430, and input/output devices 440. The processor 410, the memory 420, the storage device 430, and the input/output devices 440 can be interconnected via a system bus 450. The processor 410 is capable of processing instructions for execution within the computing system 400. Such executed instructions can implement one or more components of, for example, the system 299. In some implementations, the processor 410 can be a single-threaded processor. Alternately, the processor 410 can be a multi-threaded processor. The processor 410 is capable of processing instructions stored in the memory 420 and/or on the storage device 430 to display graphical information for a user interface provided via the input/output device 440, such as a screen, keyboard, and/or other input/output devices.

The memory 420 is a computer readable medium such as volatile or non-volatile that stores information within the computing system 400. The memory 420 can store instructions and/or other data associated with the processes disclosed herein. The storage device 430 is capable of providing persistent storage for the computing system 400. The storage device 430 can be a floppy disk device, a hard disk device, an optical disk device, a tape device, or other suitable persistent storage means. The input/output device 440 provides input/output operations for the computing system 400. In some example embodiments, the input/output device 440 includes a keyboard and/or pointing device. In various implementations, the input/output device 440 includes a display unit for displaying graphical user interfaces.

According to some example embodiments, the input/output device 440 can provide input/output operations for a network device. For example, the input/output device 440 can include Ethernet ports or other networking ports to communicate with one or more wired and/or wireless networks (e.g., a local area network (LAN), a wide area network (WAN), the Internet).

In some example embodiments, the computing system 400 can be used to execute various interactive computer software applications that can be used for organization, analysis and/or storage of data in various formats. Alternatively, the computing system 400 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 440. The user interface can be generated and presented to a user by the computing system 400 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Further non-limiting aspects or implementations are set forth in the following numbered examples:

Example 1: A method comprising: receiving, a specification file comprising values describing an application programming interface (API); retrieving, from a database, a template of the API based on at least one of the values; generating, using the template, a source code of the API and a test corresponding to the source code, wherein generating the source code of the API comprises generating a parameterized predefined code from the template and modifying the parameterized predefined code to replace parameters based on the values of the specification file; and validating the source code of the API using the test.

Example 2: The method of claim 1, further comprising: determining whether the specification file originates from a whitelisted server.

Example 3: The method of claim 1, further comprising: generating a notification indicating completion of a validation of the source code of the API.

Example 4: The method of claim 1, wherein the specification file comprises a mark-up language and a standardized tagging structure to describe paths, operations, and parameters of the API.

Example 5: The method of claim 1, wherein generating the test comprises collating the specification file with the template to generate the test.

Example 6: The method of claim 1, further comprising: deploying the source code of the API to an environment.

Example 7: The method of claim 6, wherein validating the source code of the API using the test comprises verifying an execution of each function of the source code for one or more conditions of the environment.

Example 8: The method of claim 1, further comprising: verifying a database to determine whether an API matching the specification file already exists.

Example 9: The method of claim 1, wherein the test comprises a model validation test code or a domain host test code.

Example 10: The method of claim 1, wherein the template comprises a building frame of the API and unit test blocks of the test.

Example 11: The method of claim 1, wherein retrieving the template is by a template engine that comprises an application for matching the at least one of the values with the template.

Example 12: A system, comprising: at least one data processor; and at least one memory storing instructions which, when executed by the at least one data processor, cause operations comprising: receiving, a specification file comprising values describing an application programming interface (API); retrieving, from a database, a template of the API based on at least one of the values; generating, using the template, a source code of the API and a test corresponding to the source code, wherein generating the source code of the API comprises generating a parameterized predefined code from the template and modifying the parameterized predefined code to replace parameters based on the values of the specification file; and validating the source code of the API using the test.

Example 13: The system of claim 12, wherein the specification file comprises a mark-up language and a standardized tagging structure to describe paths, operations, and parameters of the API.

Example 14: The system of claim 12, wherein generating the test comprises collating the specification file with the template to generate the test.

Example 15: The system of claim 12, wherein validating the source code of the API using the test comprises verifying an execution of each function of the source code for one or more conditions of an environment.

Example 16: The system of claim 12, wherein the test comprises a model validation test code or a domain host test code.

Example 17: The system of claim 12, wherein the template comprises a building frame of the API and unit test blocks of the test.

Example 18: The system of claim 12, wherein retrieving the template is by a template engine that comprises an application for matching the at least one of the values with the template.

Example 19: A non-transitory computer-readable storage medium comprising programming code, which when executed by at least one data processor, causes operations comprising: receiving, a specification file comprising values describing an application programming interface (API); retrieving, from a database, a template of the API based on at least one of the values; generating, using the template, a source code of the API and a test corresponding to the source code, wherein generating the source code of the API comprises generating a parameterized predefined code from the template and modifying the parameterized predefined code to replace parameters based on the values of the specification file; and validating the source code of the API using the test.

Example 20: The non-transitory computer-readable storage medium of claim 19, wherein the specification file comprises a mark-up language and a standardized tagging structure to describe paths, operations, and parameters of the API.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
receiving a specification file comprising values describing an application programming interface (API);
retrieving, from a database, a template of the API based on at least one of the values;
generating, using the template, a source code of the API, wherein generating the source code of the API comprises generating a parameterized predefined code from the template and modifying the parameterized predefined code to replace parameters based on the values of the specification file;
generating, using the template and the source code of the API, a test corresponding to the source code, wherein the test comprises collating values extracted from the specification file with the template and comprises environment specific API calls; and
validating the source code of the API using the test by verifying an execution of each of an environment function of the source code for one or more conditions of an environment.

2. The method of claim 1, further comprising:
determining whether the specification file originates from a whitelisted server.

3. The method of claim 1, further comprising:
generating a notification indicating completion of a validation of the source code of the API.

4. The method of claim 1, wherein the specification file comprises a mark-up language and a standardized tagging structure to describe paths, operations, and parameters of the API.

5. The method of claim 1, further comprising: deploying the source code of the API to the environment.

6. The method of claim 1, further comprising:
verifying the database to determine whether an API matching the specification file already exists.

7. The method of claim 1, wherein the test comprises a model validation test code or a domain host test code.

8. The method of claim 1, wherein the template comprises a building frame of the API and unit test blocks of the test.

9. The method of claim 1, wherein retrieving the template is by a template engine that comprises an application for matching the at least one of the values with the template.

10. A system, comprising:
at least one data processor; and
at least one memory storing instructions which, when executed by the at least one data processor, cause operations comprising:
receiving a specification file comprising values describing an application programming interface (API);
retrieving, from a database, a template of the API based on at least one of the values;
generating, using the template, a source code of the API, wherein generating the source code of the API comprises generating a parameterized predefined code from the template and modifying the parameterized predefined code to replace parameters based on the values of the specification file;
generating, using the template and the source code of the API, a test corresponding to the source code, wherein the test comprises collating values extracted from the specification file with the template and comprises environment specific API calls; and validating the source code of the API using the test by verifying an execution of each of an environment function of the source code for one or more conditions of an environment.

11. The system of claim 10, wherein the specification file comprises a mark-up language and a standardized tagging structure to describe paths, operations, and parameters of the API.

12. The system of claim 10, wherein the test comprises a model validation test code or a domain host test code.

13. The system of claim 10, wherein the template comprises a building frame of the API and unit test blocks of the test.

14. The system of claim 10, wherein retrieving the template is by a template engine that comprises an application for matching the at least one of the values with the template.

15. A non-transitory computer-readable storage medium comprising programming code, which when executed by at least one data processor, causes operations comprising:
  receiving a specification file comprising values describing an application programming interface (API);
  retrieving, from a database, a template of the API based on at least one of the values;
  generating, using the template, a source code of the API, wherein generating the source code of the API comprises generating a parameterized predefined code from the template and modifying the parameterized predefined code to replace parameters based on the values of the specification file;
  generating, using the template and the source code of the API, a test corresponding to the source code, wherein the test comprises collating values extracted from the specification file with the template and comprises environment specific API calls; and
  validating the source code of the API using the test by verifying an execution of each of an environment function of the source code for one or more conditions of an environment.

16. The non-transitory computer-readable storage medium of claim 15, wherein the specification file comprises a mark-up language and a standardized tagging structure to describe paths, operations, and parameters of the API.

\* \* \* \* \*